(12) United States Patent
Chou et al.

(10) Patent No.: US 11,284,303 B2
(45) Date of Patent: Mar. 22, 2022

(54) NETWORK RESOURCE MODEL TO SUPPORT NEXT GENERATION NODE B

(71) Applicant: Apple Inc., Cupertino, CA (US)

(72) Inventors: Joey Chou, Scottsdale, AZ (US); Yizhi Yao, Chandler, AZ (US)

(73) Assignee: Apple Inc., Cupertino, CA (US)

( * ) Notice: Subject to any disclaimer, the term of this patent is extended or adjusted under 35 U.S.C. 154(b) by 43 days.

(21) Appl. No.: 16/476,028

(22) PCT Filed: Feb. 5, 2018

(86) PCT No.: PCT/US2018/016818
§ 371 (c)(1),
(2) Date: Jul. 3, 2019

(87) PCT Pub. No.: WO2018/144983
PCT Pub. Date: Aug. 9, 2018

(65) Prior Publication Data
US 2019/0357084 A1    Nov. 21, 2019

Related U.S. Application Data

(60) Provisional application No. 62/455,210, filed on Feb. 6, 2017.

(51) Int. Cl.
| | |
|---|---|
| *H04W 28/16* | (2009.01) |
| *H04L 12/24* | (2006.01) |
| *H04L 41/042* | (2022.01) |
| *H04L 41/0806* | (2022.01) |

(52) U.S. Cl.
CPC .......... *H04W 28/16* (2013.01); *H04L 41/042* (2013.01); *H04L 41/0806* (2013.01)

(58) Field of Classification Search
CPC ... H04W 28/16; H04L 41/042; H04L 41/0806
See application file for complete search history.

(56) References Cited

U.S. PATENT DOCUMENTS

| | | | |
|---|---|---|---|
| 6,275,853 B1 * | 8/2001 | Beser | H04L 41/0213 709/223 |
| 2018/0302905 A1 * | 10/2018 | Fodor | H04L 27/2646 |
| 2019/0253888 A1 * | 8/2019 | Jerichow | H04W 12/04 |
| 2020/0107246 A1 * | 4/2020 | Henttonen | H04W 76/10 |

OTHER PUBLICATIONS

International Patent Office—International Search Report and Written Opinion dated Jun. 4, 2018 from International Application No. PCT/US2018/016818, 21 pages.
Intel, "pCR TR 32.864 add UCs on instantiation of NS containing VNF and/or PNF," 3GPP TSG SA WG5 (Telecom Management) Meeting #111, S5-171073, Agenda Item: 6.5.9, Jan. 16-20, 2017, Porto, Portugral, 4 pages.

(Continued)

*Primary Examiner* — Sm A Rahman
(74) *Attorney, Agent, or Firm* — Eschweiler & Potashnik, LLC

(57) ABSTRACT

Embodiments of the present disclosure describe methods and apparatuses for network resource modelling to support next generation node Bs.

19 Claims, 13 Drawing Sheets

(56) References Cited

OTHER PUBLICATIONS

Intel, "pCR TR 32.864 add UC on establishing the relation between VNF and PNF," 3GPP TSG SA WG5 (Telecom Management) Meeting #111, S5-171075, Agenda Item: 6.5.9, Jan. 16-20, 2017, Porto, Portugral, 2 pages.

ETSI, "Next Generation Protocols (NGP); Scenarios Definitions," ETSI GS NGP 001 V1.1.1 (Oct. 2016), 57 pages.

Intel Corporation, "NFV Terminology," 3GPP TSG-RAN3 Meeting #93bis, R3-162236, Agenda item: 10.6.3, Oct. 10-14, 2016, Sophia, Antipolis, France, 2 pages.

ZTE, "The capacity requirement for the interface between CU and DU," 3GPP TSG RAN WG2 #93bis, R2-162625, Agenda item: 9.5.1, Apr. 11-15, 2016, Dubrovnik, Croatia, 3 pages.

ITU-T, "Series Q: Switching and Signalling Signalling requirements and protocols for IMT-2000," International Telecommunication Union, IMT-2000 references to Release 11 of GSM evolved UMTS core network, Q.1741.9 (Jun. 2015), 480 pages.

3GPP, "Technical Specification Group Services and System Aspects; Iecommunication management; Generic Network Resource Model (NRM) Integration Reference Point (IRP); Information Service (IS) (Release 13)," 3GPP TS 28.622 V13.1.0 (Dec. 2016), Lte Advanced Pro, 22 pages.

3GPP, "Evolved Universal Terrestrial Radio Access Network (E-UTRAN) Network Resource Model (NRM) Integration Reference Point (IRP); Information Service (IS) (Release 13)," 3GPP TS 28.658 V13.1.0 (Jun. 2016), Lte Advanced Pro, 51 pages.

3GPP, "Technical Specification Group Services and System Aspects; Telecommunication management; Fixed Mobile Convergence (FMC) Model repertoire (Release 14)," 3GPP TS 32.156 V14.0.0 (Dec. 2016), Lte Advanced Pro, 40 pages.

3GPP, Technical Specification Group Services and System Aspects; Telecommunication management; Configuration Management (CM); Name convention for managed objects (Release 13), 3GPP TS 32.300 V13.1.0 (Mar. 2016), Lte Advanced Pro, 27 pages.

3GPP, "Technical Specification Group Services and System Aspects; Telecommunication management; Configuration Management (CM); Transport Network (TN) interface Network Resource Model (NRM) Integration Reference Point (IRP); Information Service (IS) (Release 10)," 3GPP TS 32.712 V10.0.0 (Dec. 2010), Lte, 17 pages.

3GPP, "Technical Specification Group Services and System Aspects; Telecommunication management; Study on management aspects of virtualized network functions that are part of the New Radio (NR) (Release 15)," 3GPP TR 32.864 V0.1.0 (Nov. 2016). Lte Advanced Pro, 8 pages.

3GPP, "Technical Specification Group Radio Access Network; Study on New Radio Access Technology; Radio Access Architecture and Interfaces (Release 14)," 3GPP TR 38.801 V1.0.0 (Dec. 2016), Lte Advanced Pro, 72 pages.

* cited by examiner

NETWORK RESOURCE MODEL TO SUPPORT NEXT GENERATION NODE B

RELATED APPLICATION

This application is a national phase entry under 35 U.S.C. § 371 of International Application No. PCT/US2018/016818, filed Feb. 5, 2018, entitled "NETWORK RESOURCE MODEL TO SUPPORT NEXT GENERATION NODE B," which claims priority to U.S. Provisional Application No. 62/455,210, filed Feb. 6, 2017, the entire disclosures of which are hereby incorporated by reference.

FIELD

Embodiments of the present disclosure generally relate to the field of networks, and more particularly, to apparatuses, systems, and methods for a network resource model to support next generation node B.

BACKGROUND

A next generation node B ("gNB") may be split into a central unit, including one or more upper layers of the gNB, and a distributed unit, including one or more lower layers of the gNB. A centralized unit may be deployed with network function virtualization ("NFV"). Thus, a gNB may compose a central unit that is implemented as a virtual network function ("VNF") running in a cloud, and a distributed unit in a cell site that provides wireless communication to a user equipment.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

For the purposes of the present disclosure, the phrases "A or B," "A and/or B," and "A/B" mean (A), (B), or (A and B).

The description may use the phrases "in an embodiment" or "in embodiments," which may each refer to one or more of the same or different embodiments. Furthermore, the terms "comprising," "including," "having," and the like, as used with respect to embodiments of the present disclosure, are synonymous.

Various embodiments provide network resource model enhancements to support gNB and lifecycle management functions to instantiate a network service ("NS") to contain the VNF and physical network function ("PNF") that form a gNB.

Figure 1:
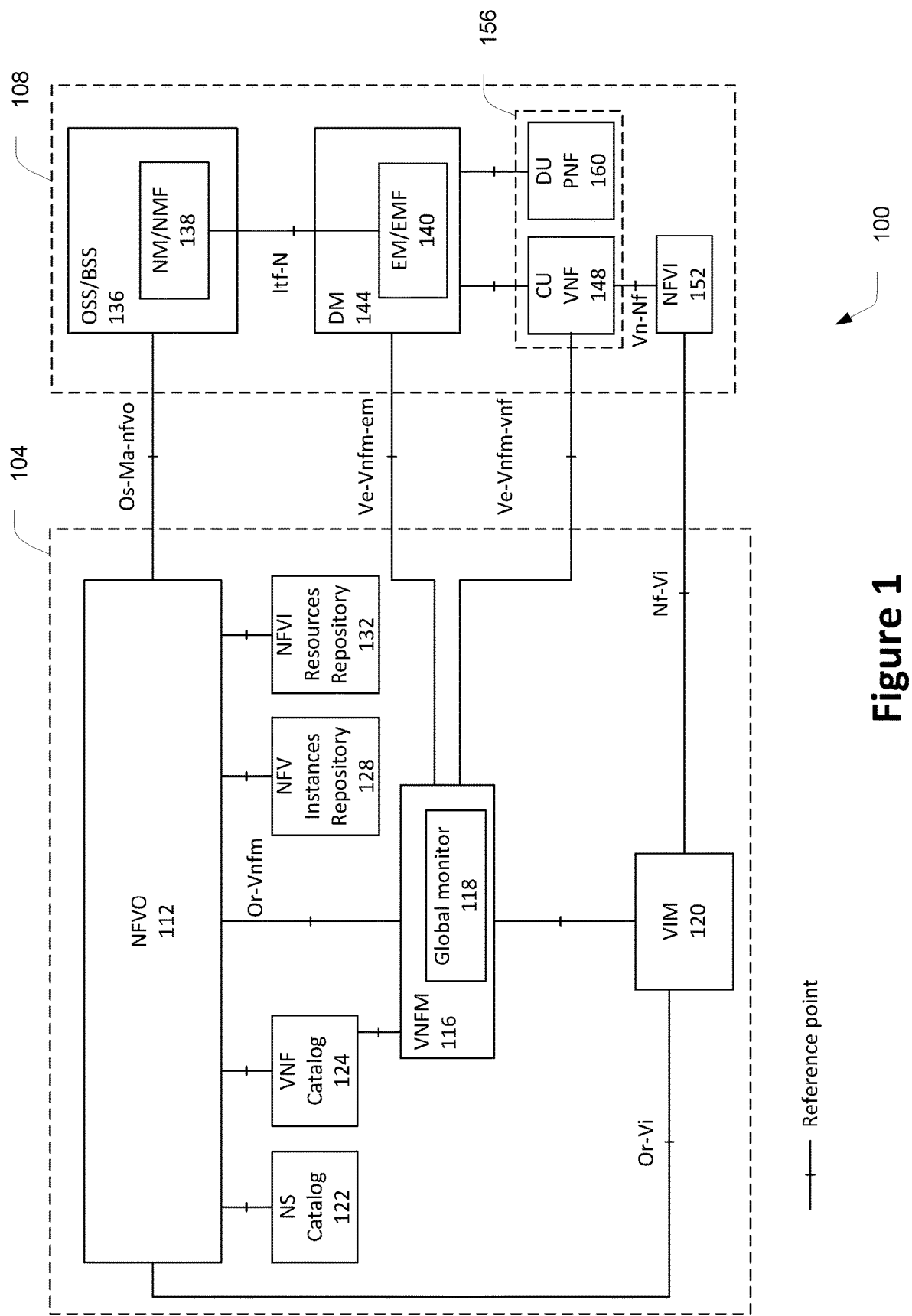
FIG. 1 illustrates a management architecture in accordance with some embodiments.

FIG. 1 illustrates a management architecture 100 and reference points in accordance with some embodiments. The management architecture 100 may be employed in a network that operates in compliance with 3rd Generation Partnership Project, 3GPP, specifications.

The management architecture 100 may include a network functions virtualization management and orchestration ("NFV-MANO") system 104 coupled with a new radio ("NR") service system 108 as shown. Each module shown in the management architecture 100 may represent a module designed to provide discrete operations, including, for example, management, orchestration, and communication operations, that are to facilitate provision of network services by the NR service system 108. Network service may be achieved through any combination of VNFs and PNFs, which may be chained together.

The network service may be any type of service provided by network functions including next generation radio access network ("NG-RAN") functions or next generation core network ("NG-core") functions of a cellular network. NG-RAN functions may include functions associate with a gNB, while NG-core functions may include functions associated with a mobility management entity ("MME"), a packet data network gateway ("PGW"), a serving gateway ("SGW"), a policy charging and rules function ("PCRF"), a home location register ("HLR"), a visitor location register ("VLR"), a home subscriber server ("HSS"), a serving general packet radio service support node ("SGSN"), a gateway general packet radio service support node ("GGSN"), etc.

The modules of the management architecture 100 will be briefly described. However, unless otherwise described, operation of the modules of the management architecture 100 may be consistent with descriptions in European Telecommunications Standards Institute, ETSI, Group Specification, GS, NFV-Management and Orchestration, MAN, 001 V1.1.1 (2014-12).

In general, various computer systems may be adapted to provide the operations described with respect to the modules of the management architecture 100. Some specifically adapted computer systems are described herein with respect to modules implementing operations of various embodiments. However, operations described with respect to other modules may be performed by similar computer systems adapted based on the objectives and implementation details associated with the particular modules.

The modules of the management architecture 100 are shown coupled with one another by various reference points. In some embodiments, specific implementations of the management architecture 100 may result in some of the modules being combined with others. In such cases, the reference point coupling the combined modules may be internalized.

In general, the NFV-MANO system 104 may provide management and orchestration operations to facilitate provision of virtualized network functions by the NR service system 108. The NFV-MANO system 104 may include a network function virtualization orchestrator ("NFVO") 112 coupled with a virtual network function manager ("VNFM") 116. The NFVO 112 may be further coupled with a number of data repositories such as, but not limited to, an NS catalog 122, a VNF catalog 124, a network function virtualization ("NFV") instances repository 128, and an NFV infrastructure ("NFVI") resources repository 132.

The NFVO 112 may provide network service orchestration by coordinating the lifecycle of VNFs that jointly realize a network service. This may include managing the associations between different VNFs and the topology of an NS and VNF forwarding graph descriptors ("VNFFGs") associated with the NS. It may be desirable for the NFVO 112 to be aware of all the resources available for reservation allocation at NFVI for an NS instance.

The NFVO 112 may be coupled with a VNF manager ("VNFM") 116 by an Or-Vnfm reference point. The VNFM 116 may be responsible for managing lifecycles of VNF instances. In various embodiments, the VNFM 116 may provide traditional management operations such as, but not limited to, fault management, configuration management, accounting management, performance management, and security management. The VNFM 116 may also provide scaling operations to change a configuration of virtualized resources. The scaling operations may include, but are not limited to, scaling up (for example, adding a central processing unit, CPU), scaling down (for example, removing a CPU or releasing some virtualized resources), scaling out (for example, adding a new virtual machine, VM), and scaling in (for example, shutting down and removing a VM instance).

In some embodiments, the VNFM 116 may include a global monitor 118. The global monitor 118 may be a background process that collects measurements related to performance metrics of resources on which the VNFs are running.

The NS catalog 122 may represent a repository of all on-boarded network services to support creation and management of NS deployment templates. The NS deployment templates may include, but are not limited to, network service descriptor ("NSD"), virtual link descriptor ("VLD"), a VNF descriptor ("VNFD"), and a VNF forwarding graph descriptor, VNFFGD.

The VNF catalog 124 may represent a repository of all on-boarded VNF packages. As used herein, the VNF package may include, for example, a VNFD, software images, manifest files, etc. The information in the VNF catalog 124 may support creation and management of the VNF packages via interface operations exposed by the NFVO 112.

The VNF catalog 124 may be coupled with the NFVO 112 and the VNFM 116 via respective reference points. The NFVO 112 or the VNFM 116 may query the VNF catalog 124 to find and retrieve a VNFD to support operations such as, but not limited to, validation, checking instantiation feasibility, etc.

The NFV instances repository 128 may hold information of all VNF and NS instances.

Each VNF/NS instance may be represented by a VNF/NS record that is updated during the lifecycle of the respective instances to reflect changes resulting from execution of VNF/NS lifecycle management operations.

The NFVI resources repository 132 may hold information about available, reserved, and allocated NFVI resources as abstracted by a virtualized infrastructure manager, VIM, 120 coupled with the VNFM 116.

The VIM 120 may control and manage the NFVI resources, for example, compute, storage, and network resources used for NFV. In some embodiments, the VIM 120 may manage only a subset of one or more types of NFVI resources (for example, compute-only, storage-only, or networking-only). In other embodiments, the VIM 120 may manage a plurality of types of NFVI resources.

In addition to being coupled with the VNFM 116, the VIM 120 may also be coupled with the NFVO 112 by an Or-Vi reference point.

The NR service system 108 may include an operations support system/business support system (OSS/BSS) 136, which may be composed of one or more devices to manage and orchestrate legacy systems by providing functions such as, but not limited to, network inventory, service provisioning, network configuration, and fault management. The OSS/BSS 136 may have full end-to-end visibility of services provided by legacy network systems.

The OSS/BSS 136 may be coupled with the NFVO 112 by an Os-Ma-nfvo reference point.

The OSS/BSS 136 may include, or otherwise be coupled with, a network manager ("NM")/network manager function ("NMF") 138, representing a network manager of the NR service system 108, that is coupled with one or more element managers ("EMs")/element manager functions ("EMFs") including, for example, EM/EMF 140, representing an element manager of the NR service system 108.

The NM/NMF 138 may primarily deal with network configuration (for example, configuring network routing tables), testing, and traffic analysis. The NM/NMF 138 may provide a package of end-user functions with the responsibility for the management of the network supported, for example, by the EM/EMF 140. The NM/NMF 138 may send configuration management ("CM") commands to the EM/EMF 140 to perform various CM operations such as, for example, create, modify, or delete information object classes ("IOCs").

In a 3GPP management framework, an IOC may represent management aspects of a network resource. An IOC may describe information that can be passed or used in management interfaces. An IOC may have attributes that represent various properties of the class of objects. An attribute may be a typed element (for example, an element that refers to a constrained set of values) that represents a property of a class. An IOC may support operations providing network management services and notifications that report event occurrences relevant for a particular class of objects.

The EM/EMF 140, which may be disposed in a domain manager ("DM") 144, may be responsible for fault, configuration, performance, and security ("FCAPS") management functionality for a VNF, for example, central unit ("CU") VNF 148, and a PNF, for example, distributed unit ("DU") PNF 160. In particular, the EM/EMF 140 may provide a number of management operations with respect to the network functions provided by the CU VNF 148 and DU PNF 160. These management operations may include, but are not limited to, configuration, fault management, accounting, collection of performance measurement results, and security management. In some embodiments, the EM/EMF 140 may be coupled with the VNFM 116 over a Ve-Vnfm-em reference point in order to collaborate with the VNFM 116 to perform functions that rely on exchanges of information regarding the NFVI resources associated with the CU VNF 148.

The CU VNF 148 may be a software implementation of a network function that is capable of running on NFVI 152. The CU VNF 148 may provide the central unit functions of a gNB 156. The deployment and operational behavior of the CU VNF 148 may be described in a corresponding VNFD that may be stored in the VNF catalog 124.

The CU VNF 148 may be coupled with the VNFM 116 by a Ve-Vnfm-vnf reference point.

The Ve-Vnfm-vnf reference point may support the exchange of messages that provide VNF instantiation, queries, updates, scaling, verification, configuration, etc.

The NFVI 152 may represent the hardware (for example, compute, storage, and networking circuitry) and software (for example, hypervisors) components that collectively provide the infrastructure resources where the CU VNF 148 is deployed. In some embodiments, the NFVI 152 may also include partially virtualized NFs that have part of their functionality virtualized and other parts embodied in a PNF (for example, built in silicon) due to, for example, physical constraints or vendor design choices.

The NFVI 152 may be coupled with the VIM 120 by an Nf-Vi reference point. The Nf-Vi reference point may support the exchange of VM management messages to provide/update VM resources allocation, migrate/terminate VMs, manage connections between VMs, etc.

The DU PNF 160 may provide the distributed unit functions of the gNB 156. The DU PNF 160 may be disposed at a cell site, while the CU VNF 148/NFVI 152 may be disposed remote from the cell site in, e.g., a server of the NG-core.

Figure 2:
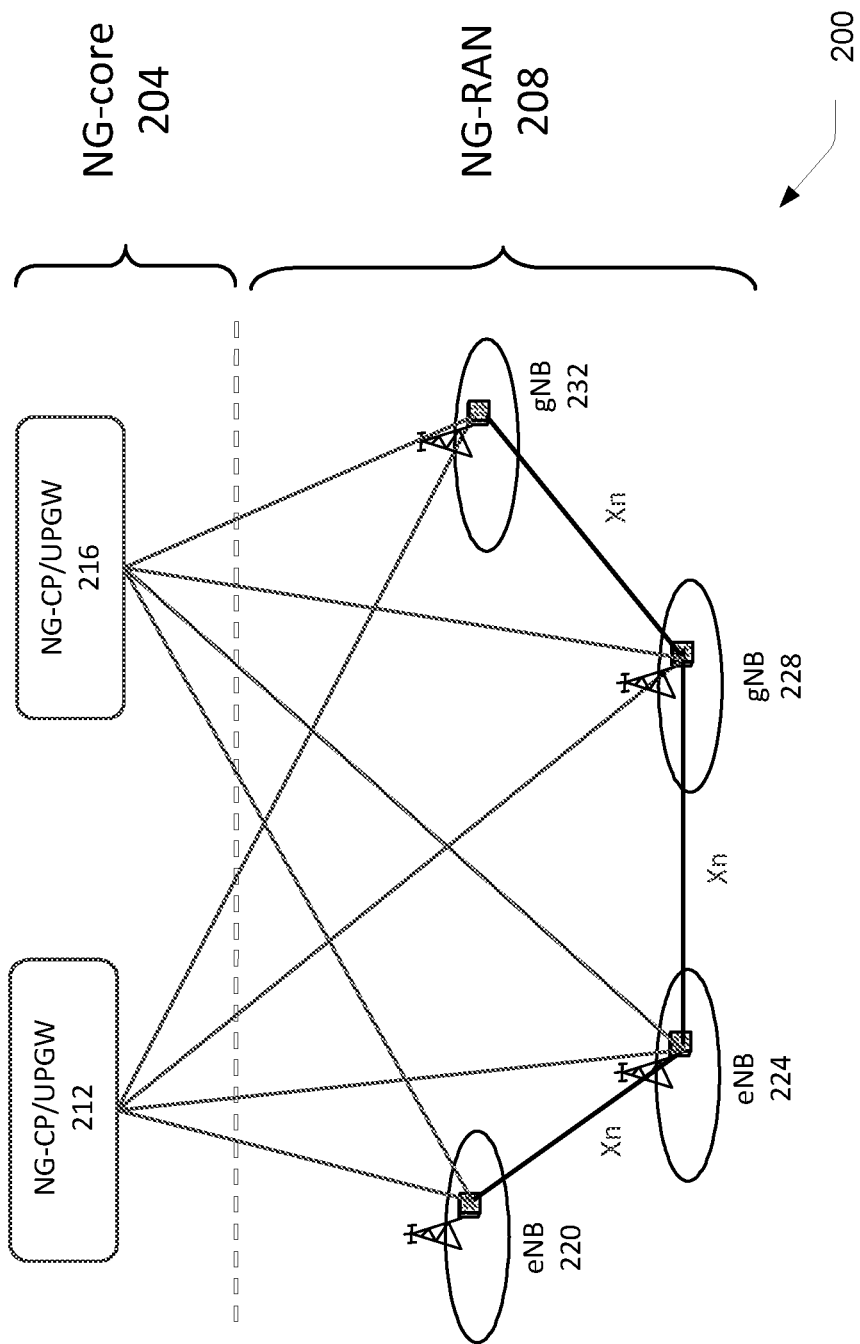
FIG. 2 illustrates a new radio architecture in accordance with some embodiments.

FIG. 2 illustrates an NR architecture 200 according to some embodiments. The NR architecture 200 may include an NG-core 204 and an NG-RAN 208.

The NG-core 204 may include one or more NG-control plane/user plane gateways ("CP/UPGWs") such as, for example, NG-CP/UPGW 212 and NG-CP/UPGW 216. The NG-RAN 208 may include a number of radio access network ("RAN") nodes such as, for example, evolved node B ("eNB") 220, eNB 224, gNB 228, and gNB 232. The RAN nodes may be coupled with one another by Xn interfaces.

The NG-CP/UPGW 212 and NG-CP/UPGW 216 may each be coupled with each of the RAN nodes of the NG-RAN 208. Thus, NG-core 204 may interface to both eNBs and gNBs.

As described above, the functionality of a gNB may be split between a DU and a CU.

Figure 3:
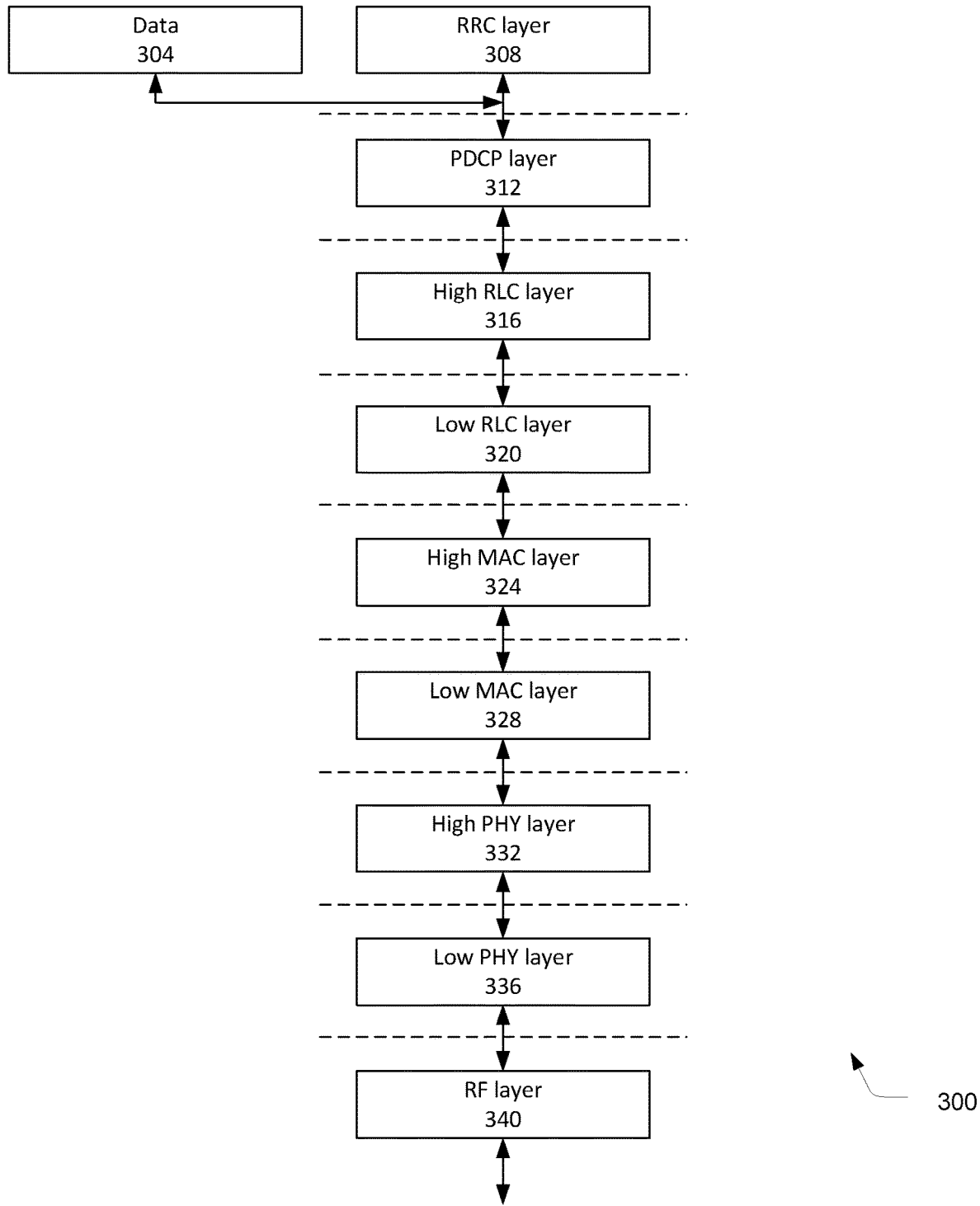
FIG. 3 illustrates various layers of a next generation node B in accordance with some embodiments.

FIG. 3 illustrates various layers of a gNB 300 and options for splitting the layers between a DU and a CU according to some embodiments. The dotted lines in FIG. 3 illustrate eight options for splitting the gNB between the DU and the CU, with the upper layers in the CU and the lower layers in the DU. Each CU-DU split option may have specific characteristics such as those listed in Table 11.2.2.9-1 of 3GPP Technical Report ("TR") 38.801, V1.0.0 (2016-12).

In some embodiments, transport network latency and transport network peak bandwidth may be primary considerations for determining a CU-DU split option. Table A-1 of 3GPP TR 38.801 lists bandwidth and latency of underlying transport networks that may be considered for each CU-DU functional split option. In some embodiments, a specific underlying transport network (for example, an optical transport network, etc.) may be used between the devices that implement the CU and the DU in order to provide desired interface characteristics with respect to, for example, bandwidth and latency. Furthermore, a distance between the devices that implement the CU and the DU may be limited in order to provide desired interface characteristics.

The gNB 300 may include data 304, which may represent a data source or sink depending on whether the gNB 300 is engaged in downlink communications or uplink communications, respectively.

The gNB 300 may include radio resource control ("RRC") layer 308; packet data convergence protocol ("PDCP") layer 312; high radio link control ("RLC") layer 316; low RLC layer 320; high media access control ("MAC") layer 324; low MAC layer 328; high physical ("PHY") layer 332; low PHY layer 336; and radio-frequency ("RF") layer 340.

The RRC layer 308 may be responsible for broadcasting system information in, for example, master information blocks ("MIBs") or system information blocks ("SIBs"); paging procedures; managing RRC connection between a UE and next generation universal terrestrial radio access network ("GUTRAN") (for example, RRC connection paging, RRC connection establishment, RRC connection modification, and RRC connection release); managing radio bearers (for example, establishing, configuring, maintaining, and releasing point-to-point radio bearers); security functions (for example, key management); inter radio access technology ("RAT") mobility; and measurement configuration for UE measurement reporting. Said MIBs and SIBs may comprise one or more information elements ("IEs"), which may each comprise individual data fields or data structures.

The PDCP layer 312 may execute header compression and decompression of IP data, maintain PDCP Sequence Numbers ("SNs"), perform in-sequence delivery of upper layer packet data units ("PDUs") at re-establishment of lower layers, eliminate duplicates of lower layer service data units ("SDUs") at re-establishment of lower layers for radio bearers mapped on RLC acknowledged mode ("AM"), cipher and decipher control plane data, perform integrity protection and integrity verification of control plane data, control timer-based discard of data, and perform security operations (e.g., ciphering, deciphering, integrity protection, integrity verification, etc.).

The RLC layer (including the high RLC layer 316 and the low RLC layer 320) may operate in a plurality of modes of operation, including: transparent mode ("TM"), unacknowledged mode ("UM"), and AM. The RLC layer may execute transfer of upper layer protocol data units ("PDUs"), error correction through automatic repeat request ("ARQ") for AM data transfers, and concatenation, segmentation and reassembly of RLC SDUs for UM and AM data transfers. The RLC layer may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

In some embodiments, the high-RLC layer 316 may perform the ARQ and re-ordering operations, while the low-RLC layer 320 may perform the segmentation and concatenation operations. In other embodiments, the high/low-RLC layers may be split in other manners.

The MAC layer (including the high MAC layer 324 and the low MAC layer 328) may be responsible for mapping between logical channels and transport channels, multiplexing of MAC SDUs from one or more logical channels onto transport blocks ("TB") to be delivered to the PHY layer via transport channels, de-multiplexing MAC SDUs to one or more logical channels from TBs delivered from the PHY via transport channels, multiplexing MAC SDUs onto TBs, scheduling information reporting, error correction through hybrid automatic repeat request ("HARQ"), and logical channel prioritization. In some embodiments, the high-MAC layer 324 may perform inter-cell interference coordination and centralized scheduling that controls multiple low-MAC layers. The low-MAC layer 328, which may include more than one instance, may perform the more time-critical operations (e.g., HARQ, random access control, radio channel and signal measurements, etc.). In other embodiments, the high/low-MAC layers may be split in other manners.

The PHY layer (including the high PHY layer 332 and the low PHY layer 336) may transmit or receive information used by the MAC layer over one or more air interfaces.

The PHY layer may further perform link adaptation or adaptive modulation and coding ("AMC"), power control, cell search (e.g., for initial synchronization and handover purposes), and other measurements used by higher layers, such as the RRC layer 308. The PHY layer may still further perform error detection on the transport channels, forward error correction ("FEC") coding/decoding of the transport channels, modulation/demodulation of physical channels, interleaving, rate matching, mapping onto physical channels, and Multiple Input Multiple Output ("MIMO") antenna processing.

The PHY layer may be split differently in the uplink and downlink directions. For example, in the uplink, the low-PHY layer 336 may perform fast Fourier transform ("FFT") and CP removal, while the high-PHY layer 332 performs the remaining PHY operations. In the downlink the low-PHY layer 336 may perform the iFFT and CP addition while the high-PHY layer 332 performs the remaining PHY operations. In other embodiments, the high/low-PHY layers may be split in other manners.

The RF layer 340 may be responsible for the operations performed by RF components that enable communication with wireless networks by using modulated electromagnetic radiation through a non-solid medium. The RF components may include switches, filters, amplifiers, mixers, etc.

IOCs used to model network nodes in Long Term Evolution ("LTE") networks, for example, eNB IOC, are not able to support gNBs. In particular, the previous eNB IOCs were not capable of modeling an access node that has some functions handled by a DU and other functions handled by a CU such as that described above. Thus, various embodiments describe options for a network information model that supports gNBs. Two options that may be used to support gNBs are described below In a first option, the eNB Function IOC may be modified to support a gNB. However, this option may be complicated by the fact that both eNBs and gNBs may need to be managed at the same time and the function of the gNB may be quite different from the eNB.

In a second option, a gNB may be modelled to a gNB Function IOC, which may be contained by a Managed Element IOC. The gNB Function IOC may contain a Central Unit IOC and a Distributed Unit IOC to represent both CU and DU, respectively. The gNB Function IOC may be inherited from a Managed Function IOC. A VNF may be inherited from a Managed Function IOC. Thus, the CU VNF 148 may be modelled as a Central Unit IOC, which inherits from a Managed Function IOC. The DU PNF may be modelled as Distributed Unit IOC. The cell supported by gNB (also referred to as a next generation universal terrestrial radio access network ("GUTRAN") cell) may be modelled as a GUTRAN Cell IOC, which may be contained alternatively by a gNB Function IOC or a Central Unit IOC.

As used herein, an IOC (for example, subclass IOC) that inherits from another IOC (for example, superclass IOC) may include all the properties of the superclass IOC. The subclass IOC may change inherited support-qualifications from optional to mandatory, but not vice versa, and may change the inherited support-qualification from conditional-optional to conditional-mandatory, but not vice versa.

As used herein, an IOC (for example, a containing IOC) that contains another IOC (for example, a contained IOC) has a containment relationship with the contained IOC. For example, an eNB Function IOC may represent an eNB that has three sectors, each sector being a cell that covers 120°. Thus, the eNB Function IOC may contain three separate IOC EUTRAN Cells that respectively correspond to the three cells provided by the eNB.

Figure 4:
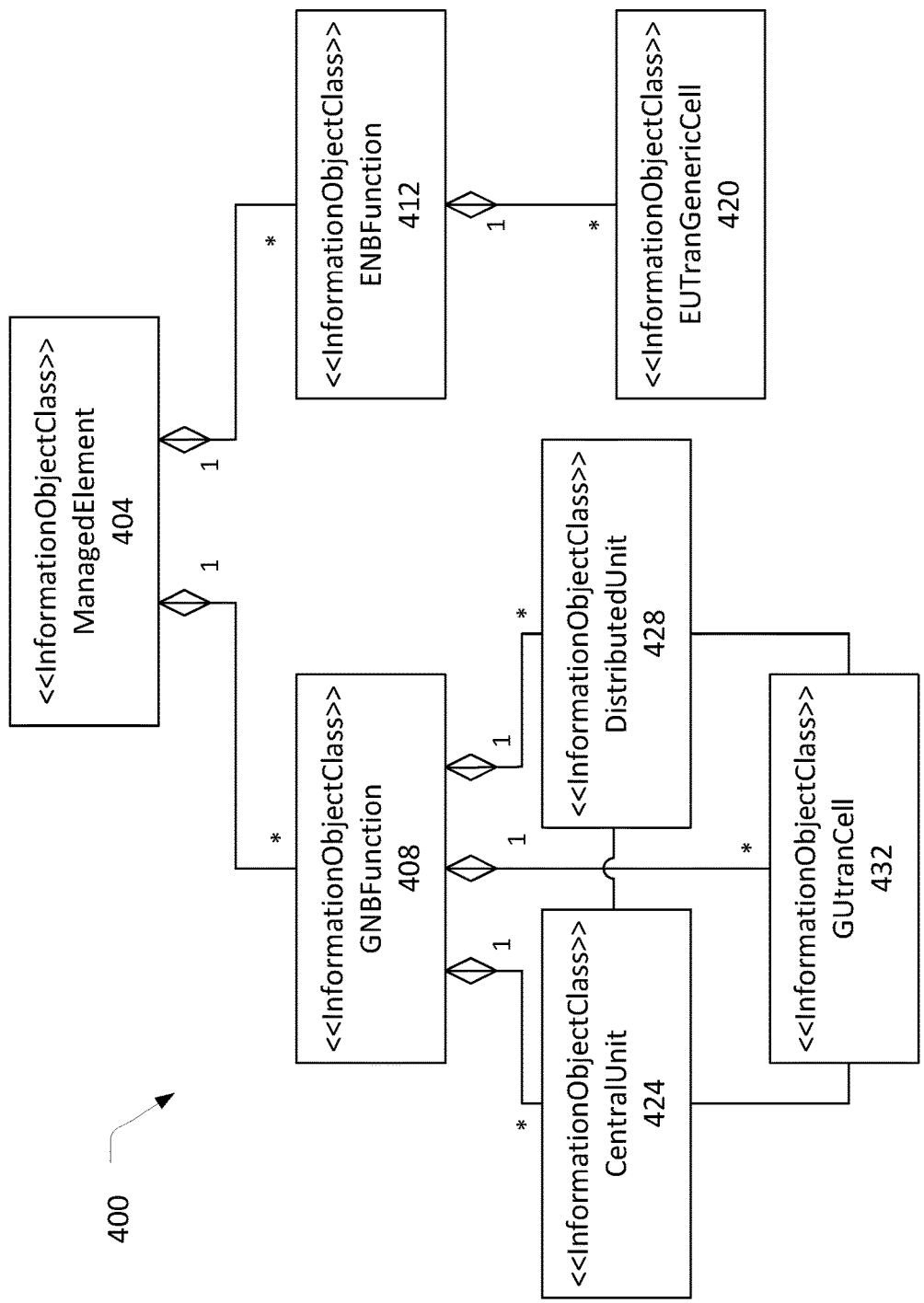
FIG. 4 illustrates a network resource model in accordance with some embodiments.

FIG. 4 illustrates a network resource model ("NRM") 400 in accordance with some embodiments. The NRM 400 illustrates containment relationships between various IOCs.

For example, the NRM 400 includes an Managed Element IOC 404 that contains a gNB Function IOC 408 and an eNB Function IOC 412. The eNB Function IOC 412 may represent an eNB, for example, eNB 220 or 224. The eNB Function IOC 412 may contain an EUTRAN Generic Cell IOC 420 that represents an EUTRAN cell.

The gNB Function IOC 408 may represent a gNB such as, for example, gNB 228 or 232.

The gNB Function IOC 408 may contain a Central Unit IOC 424 and a Distributed Unit IOC 428. The Central Unit IOC 424 may represent a central unit of the gNB corresponding to CU VNF 148, for example. The Distributed Unit IOC 428 may represent a distributed unit of the gNB corresponding to DU PNF 160, for example.

The gNB Function IOC 408 may also contain GUTRAN Cell IOC 432, which represents a GUTRAN cell provided by the corresponding gNB.

In various embodiments, various cardinalities of relations between a central unit, represented by the Central Unit IOC 424, and distributed unit, represented by the Distributed Unit IOC 428, may be supported. For example, one central unit may be related with one or a plurality of distributed units.

Furthermore, in various embodiments, various cardinalities of relations between a central unit and a GUTRAN cell, and relations between a distributed unit and a GUTRAN cell, may be supported.

The "1" and "*" notations in FIGS. 4-7 indicate a cardinality between the respective IOCs in accordance with an embodiment. For example, the "1" by eNB Function IOC 412 and "*" by EUTRAN Generic Cell IOC 420 indicates that one eNB function may contain any number of EUTRAN cells.

Figure 5:
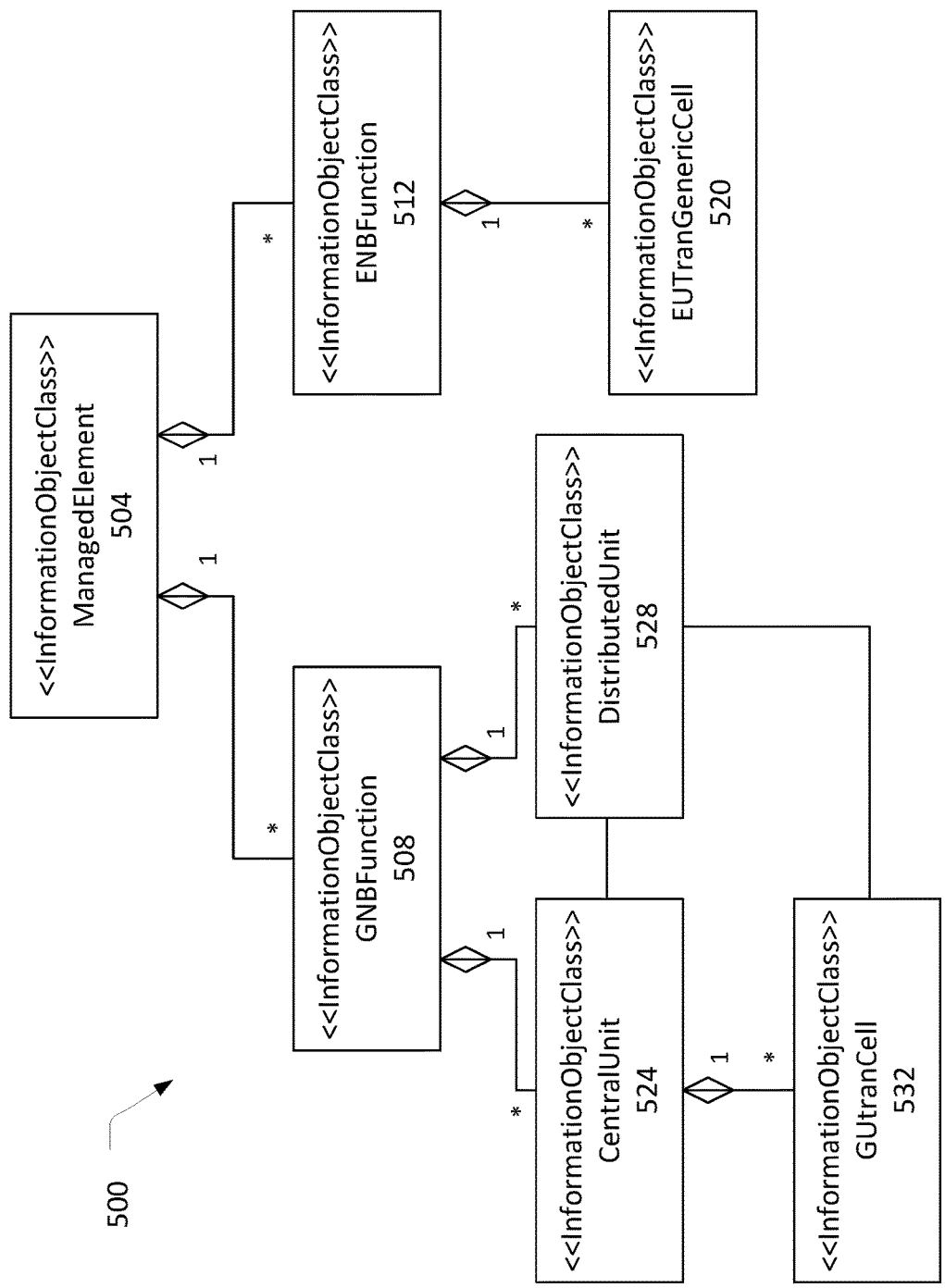
FIG. 5 illustrates a network resource model in accordance with some embodiments.

FIG. 5 illustrates an NRM 500 in accordance with some embodiments. The NRM 500 illustrates containment relationships between various IOCs. For example, the NRM 500 includes a Managed Element IOC 504 that contains an gNB Function IOC 508 and an eNB Function IOC 512. The eNB Function IOC 512 may represent an eNB, for example, eNB 220 or 224. The eNB Function IOC 512 may contain EUTRAN Generic Cell IOC 520 that represents an EUTRAN cell.

The gNB Function IOC 508 may represent a gNB such as, for example, gNB 228 or 232.

The gNB Function IOC 508 may contain a Central Unit IOC 524 and a Distributed Unit IOC 528. The Central Unit IOC 524 may represent a central unit of the gNB corresponding to CU VNF 148, for example. The Distributed Unit IOC 528 may represent a distributed unit of the gNB corresponding to DU PNF 160, for example.

The Central Unit IOC 524 may contain a GUTRAN Cell IOC 532, which represents a GUTRAN cell provided by the corresponding gNB.

In various embodiments, various cardinalities of relations between a central unit, represented by the Central Unit IOC 524, and distributed unit, represented by the Distributed Unit IOC 528, may be supported. For example, one central unit may be related with one or a plurality of distributed units.

Furthermore, in various embodiments, various cardinalities of relations between a distributed unit, represented by the Distributed Unit IOC 528, and a GUTRAN cell, represented by GUTRAN Cell IOC 532, may be supported.

Both the NRM 400 and the NRM 500 may support both standalone gNB and functional split gNB (for example, a gNB having a CU and a DU). The containment relationships in NRMs 400 and 500 may establish creation of the gNB Function IOC as a prerequisite to creation of the IOC central unit and IOC distributed unit.

Figure 6:
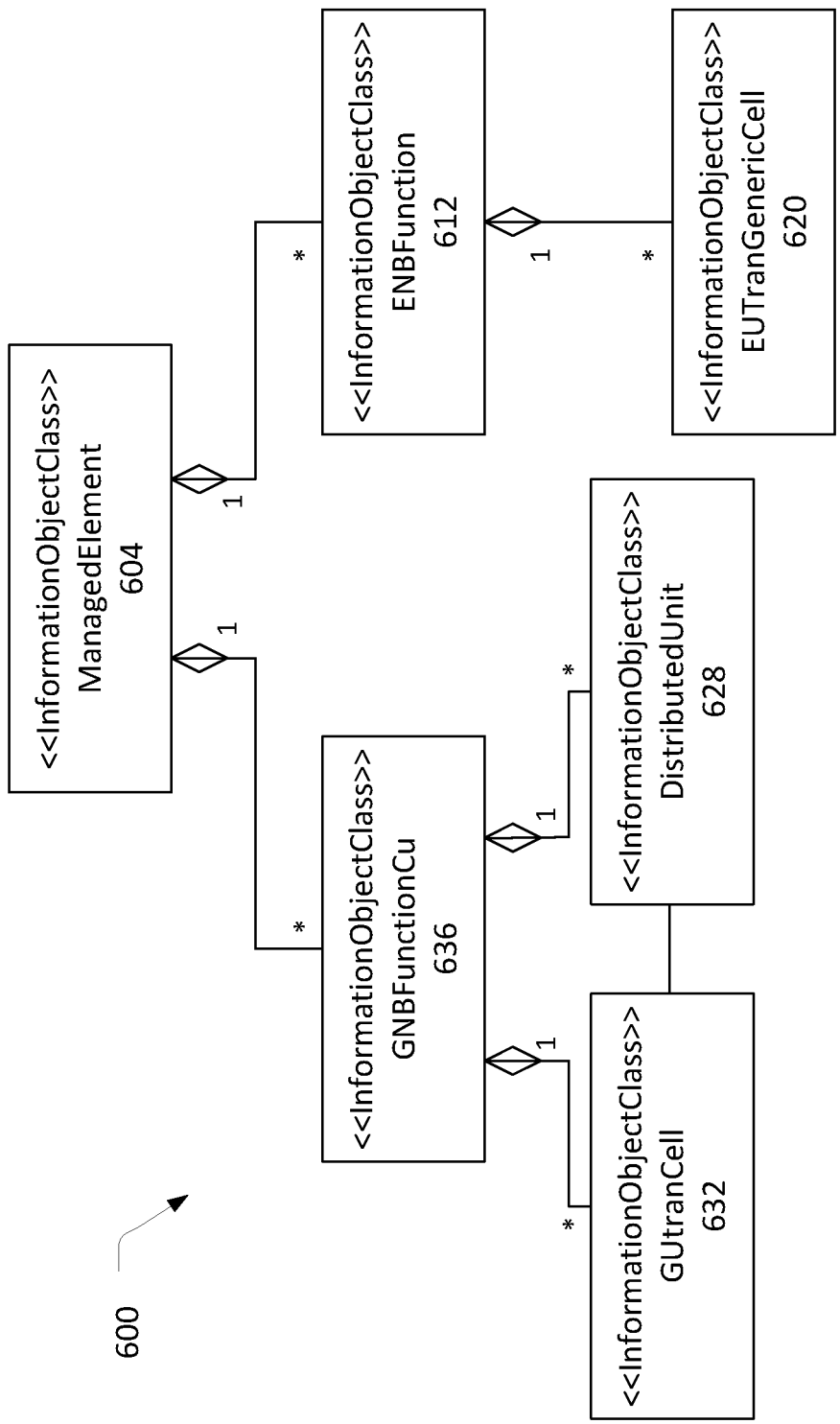
FIG. 6 illustrates a network resource model in accordance with some embodiments.

FIG. 6 illustrates an NRM 600 in accordance with some embodiments. The NRM 600 illustrates containment relationships between various IOCs. For example, the NRM 600 includes a Managed Element IOC 604 that contains an eNB Function IOC 612. The eNB Function IOC 612 may represent an eNB, for example, eNB 220 or 224. The eNB Function IOC 612 may contain EUTRAN Generic Cell IOC 620 that represents an EUTRAN cell.

The NRM 600 may include a new IOC named gNB Function CU IOC 636 contained by the Managed Element IOC 604. The gNB Function CU IOC 636 may represent a CU of the gNB such as, for example, CU VNF 148. The gNB Function CU IOC 636 may inherit from the Managed Function IOC (similar to the gNB Function IOCs 408 and 508).

The gNB Function CU IOC 636 may contain a Distributed Unit IOC 628 that represents a distributed unit of the gNB corresponding to DU PNF 160, for example.

Thus, in this case, the CU VNF 148 may be modelled as gNB Function CU IOC 636 that is inherited from Managed Function IOC; and the DU PNF 160 is modelled as Distributed Unit IOC 628.

The gNB Function CU IOC 636 may also contain GU Tran Cell IOC 632, which represents a GUTRAN cell provided by the corresponding gNB.

In various embodiments, various cardinalities of relations between a distributed unit, represented by the Distributed Unit IOC 628, and GUTRAN cell, represented by GUTRAN Cell IOC 632, may be supported.

The NRM 600 may be simpler as compared to NRMs 400 or 500, but may also lack some flexibility. For example, the instance of the Distributed Unit IOC 628 may not be created until the instance of the gNB Function CU IOC 636 is created; and one DU may not be connected to multiple CUs.

Figure 7:
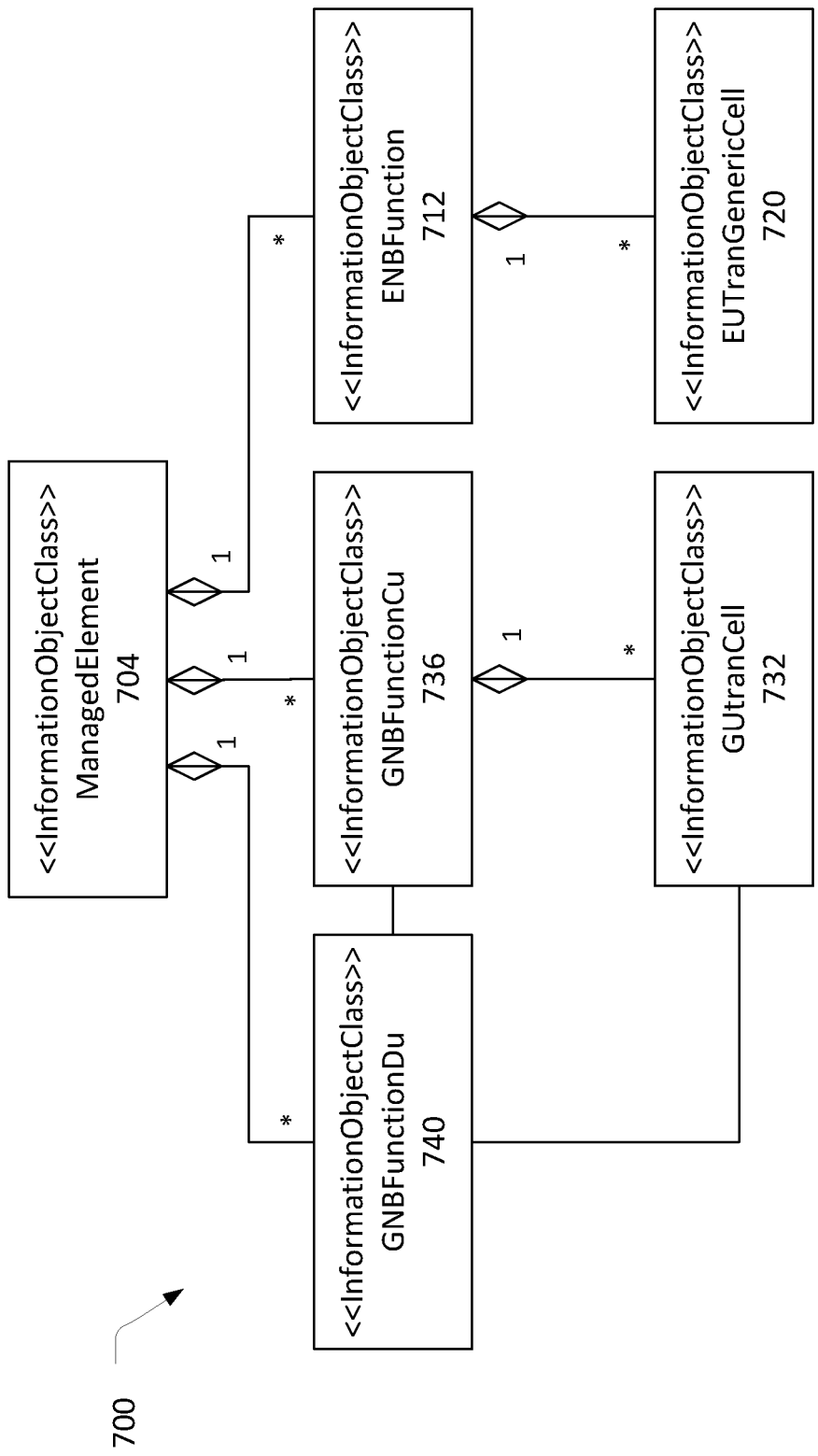
FIG. 7 illustrates a network resource model in accordance with some embodiments.

FIG. 7 illustrates an NRM 700 in accordance with some embodiments. The NRM 700 illustrates containment relationships between various IOCs. For example, the NRM 700 includes an Managed Element IOC 704 that contains an eNB Function IOC 712. The eNB Function IOC 712 may represent an eNB, for example, eNB 220 or 224. The eNB Function IOC 712 may contain an EUTRAN Generic Cell IOC 720 that represents an EUTRAN cell.

The NRM 700 may include gNB Function CU IOC 736 and gNB Function DU IOC 740, both of which may be contained by Managed Element IOC 704. The gNB Function CU IOC 736 may represent a CU of the gNB such as, for example, CU VNF 148. The gNB Function DU IOC 740 may represent a DU of the gNB such as, for example, DU PNF 160.

The gNB Function CU IOC 736 may contain GUTRAN Cell IOC 732, which represents a GUTRAN cell provided by the corresponding gNB.

Thus, in this case, the CU VNF 148 may be modelled as gNB Function CU IOC 736 that is inherited from Managed Function IOC; and the DU PNF 160 is modelled as gNB Function DU IOC 740.

In various embodiments, various cardinalities of relations between a central unit, represented by gNB Function CU IOC 740, and distributed unit, represented by the gNB Function DU IOC 740, may be supported.

The NRM 700 may be simpler as compared to NRMs 400 or 500 for functionally split gNBs. Further, the gNB Function CU IOC 736 and the gNB Function DU IOC 740 may be created independently from one another. In some embodiments, the NRM 700 may not be appropriate for standalone gNBs (for example, gNBs that are not functionally split).

Figure 8:
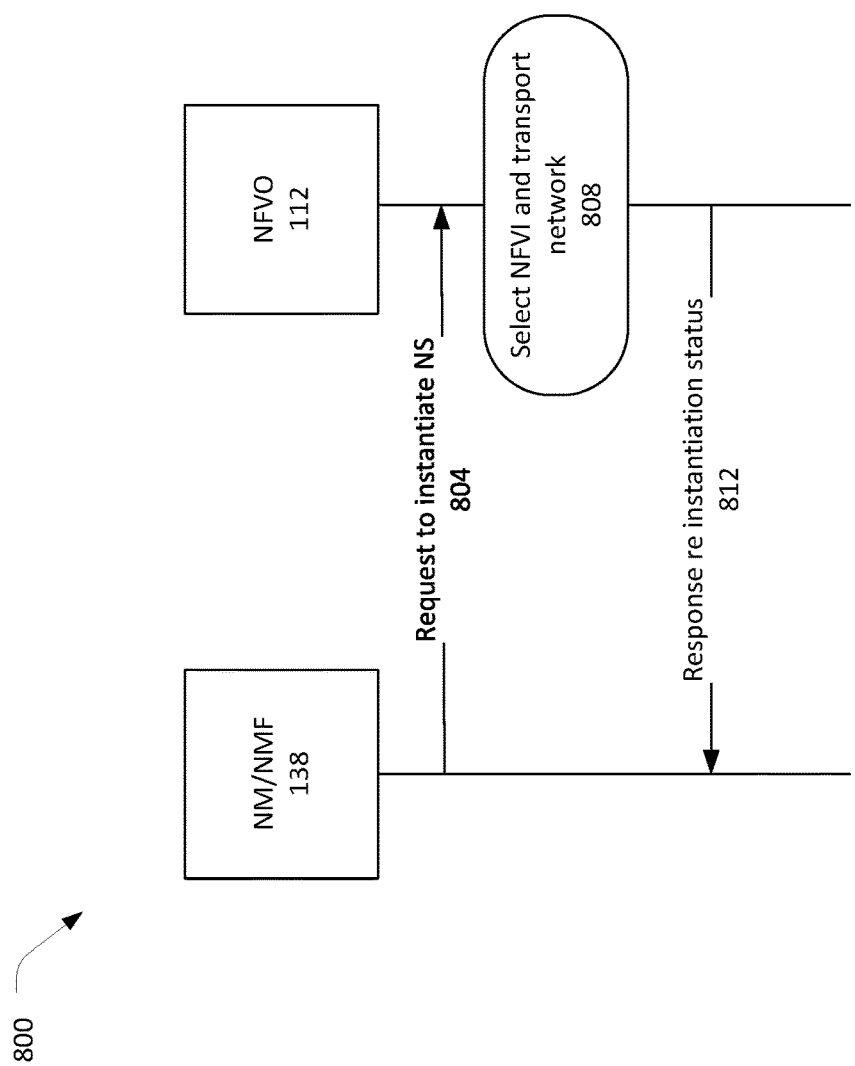
FIG. 8 illustrates a message flow in accordance with some embodiments.

FIG. 8 illustrates a message flow 800 that may be used as part of a lifecycle management use case in accordance with some embodiments. The message flow 800 may be used to instantiate an NS that contains a VNF (for example, CU VNF 148) and a PNF (for example, DU PNF 160) that form a gNB 156. Operations described with respect to the message flow 800 may be performed by circuitry/logic of the NM/NMF 138 or the NFVO 112.

The message flow 800 may occur after an operator decides to instantiate the NS; the underlying transport network requirements for the selected CU-DU functional split option are known; a VNF package for the CU VNF 148 has been on boarded and is present in the VNF catalog 124; and the PNF corresponding to DU PNF 160 has been deployed.

The message flow 800 may include, at 804, the NM/NMF 138 generating and sending a request to instantiate an NS that contains a PNF and a new VNF that form a gNB. In some embodiments, the logic/circuitry that generates the request may cause the request to be sent, but will not actually perform the sending itself. For example, the request may be generated by first logic/circuitry and provided to second logic/circuitry of, for example, a network interface that is to send the request.

The request may include an indication of the underlying transport network requirements (for example, bandwidth, latency, transport network type (for example, optical)). The request may further include an indication of location constraints for an NFVI where the VNF is to be instantiated, or PNF location.

At 808, the NFVO 112 may select an NFVI (for example, NFVI 152) where the VNF will be instantiated and a transport network to be used to connect the VNF and PNF in order to meet the underlying transport network requirements provided in the request at 804.

The message flow 800 may further include, at 812, the NFVO 112 generating and sending a response regarding the instantiation status. Similar to above, the logic/circuitry that generates the response, may cause the request to be sent, but may not actually perform the sending itself.

For example, the response may indicate that the NS has been instantiated successfully.

Alternatively, the response may indicate that the NS has not been instantiated and may further include an identification of one or more errors that indicate why the NS has not been instantiated successfully.

To facilitate instantiation of an NS as described herein, a 3GPP management system may be configured with particular requirements to facilitate managing VNFs that are part of an NR deployment. For example, lifecycle management may be provided by configuring a 3GPP management system with the following requirements: REQ-VRAN_Mgmt-CON-X—a 3GPP management system should be able to instantiate an NS containing PNF and a new VNF that form a gNB (for example, the NS lifecycle management interface produced by the NFVO 112 on the Os-Ma-nfvo reference point of FIG. 1 may support instantiating an NS); REQ-VRAN_Mgmt CON-Y—a 3GPP management system should be able to provide underlying transport network requirements on the VNF and PNF interface; and REQ-VRAN_Mgmt-CON-Z—should be able to provide the local constraints or the NFVI where the VNF is to be instantiated.

Figure 9:
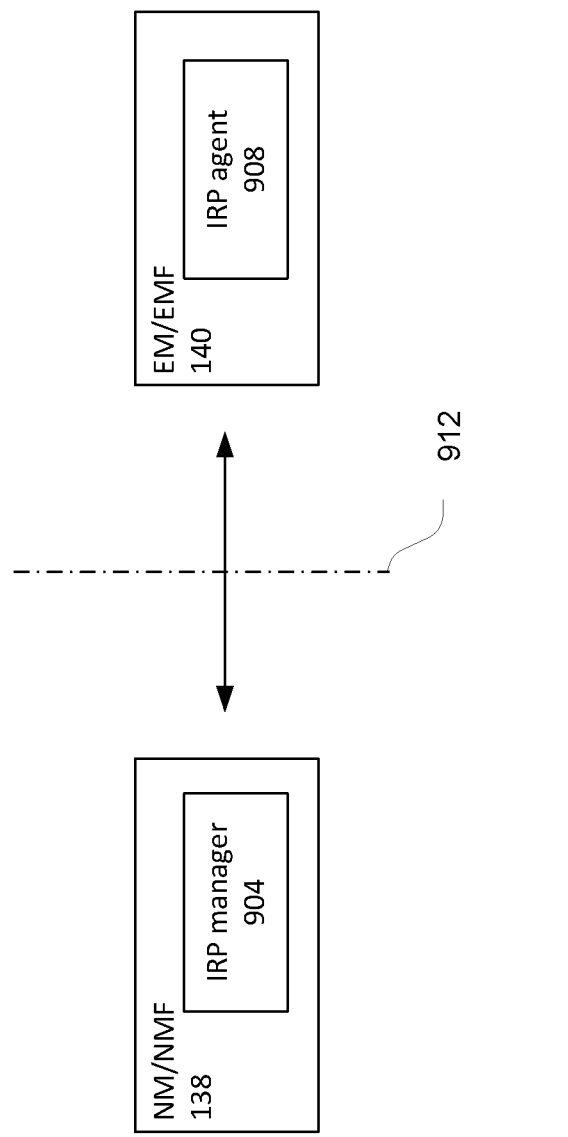
FIG. 9 illustrates a network manager/network manager function and an element manager/element manager function in accordance with some embodiments.

FIG. 9 illustrates the NM/NMF 138 and EM/EMF 140 in more detail in accordance with some embodiments. The NM/NMF 138 may include an integration reference point ("IRP") manager 904 that may be coupled with IRP agent 908 in the EM/EMF 140. The IRP manager 904 and the IRP agent 908 may transmit configuration management information over interface ("Itf-N") 912. An IRP may describe a set of specifications for defining aspects of the management interface including, for example, the requirement specification, and information service specification, and one or more solution set specifications. The Itf-N 912 may represent a basic configuration management ("CM") IRP over which CM commands/responses are communicated.

Figure 10:
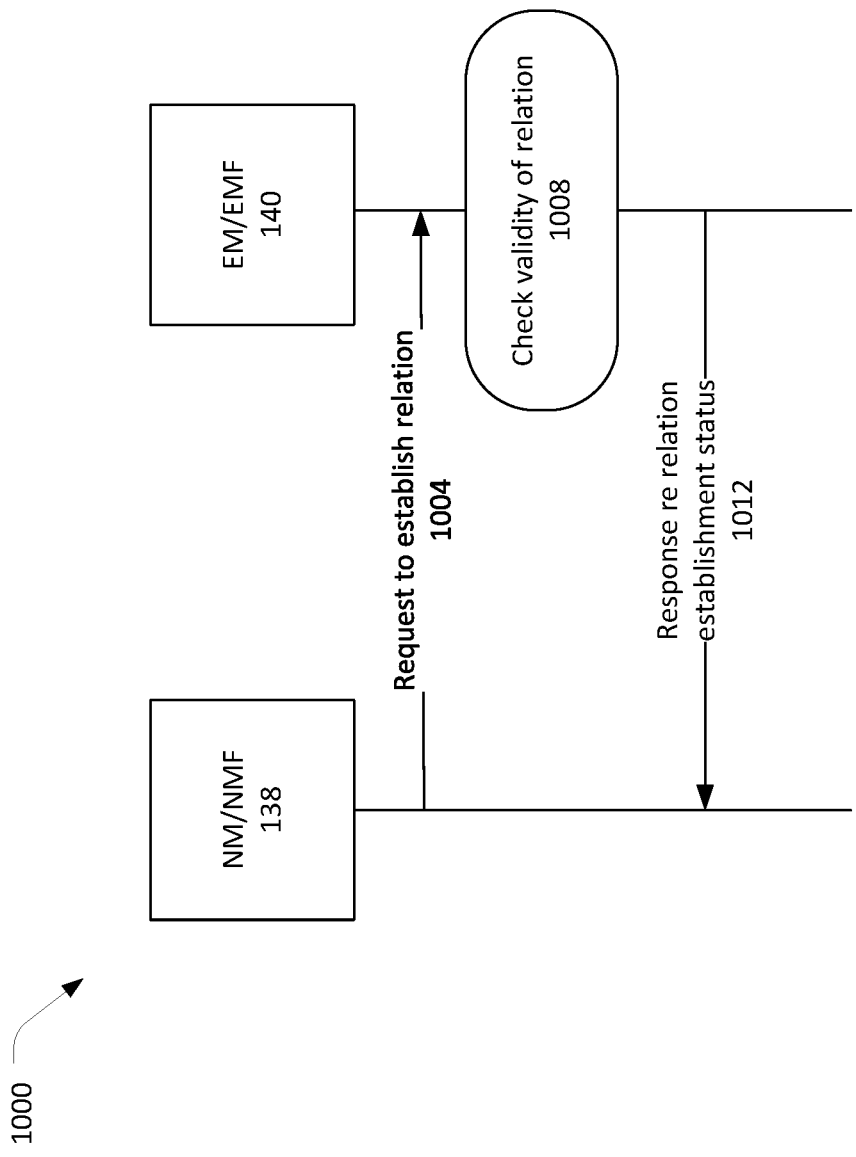
FIG. 10 illustrates a message flow in accordance with some embodiments.

FIG. 10 illustrates a message flow 1000 between the NM/NMF 138 and the EM/EMF 140 in accordance with some embodiments. The message flow 1000 may be used to establish a relationship between a VNF (for example, CU VNF 148) and a PNF (for example, DU PNF 160) of a gNB (for example, gNB 156). Operations described with respect to the message flow 1000 may be performed by circuitry/logic of the NM/NMF 138 or the EM/EMF 140. In some embodiments, the circuitry/logic of the NM/NMF 138 may implement an IRP manager (for example, IRP manager 904) to provide some or all of the operations of the message flow 1000; and the circuitry/logic of the EM/EMF 140 may implement an IRP agent (for example, IRP agent 908) to provide some or all of the operations of message flow 1000.

Various issues related to the establishment of the relation between a VNF and a PNF may be considered. For example, the granularity of the CU/DU functional split may have the following options: per CU; and per DU. For the per-CU option, each CU may have a fixed split, and the DUs may be configured to match this. For example, if a CU is created with split option 3, the DU may need to be configured to support split option 3 so it can be connected to this CU. For the per-DU option, each DU may be configured with a different split, with the choice of a DU split depending on specific topology or backhaul support in a given area.

The message flow 1000 may occur after a VNF that is part of a gNB has been instantiated; a PNF that is part of the gNB has been deployed; and the NM/NMF knows which VNF instance and PNF instance can form a gNB.

The message flow 1000 may include, at 1004, the NM/NMF 138 generating and sending a request to establish a relation between a VNF instance and a PNF instance to form a gNB.

In some embodiments, the logic/circuitry that generates the request, may cause the request to be sent, but will not actually perform the sending itself. For example, the request may be generated by first logic/circuitry and provided to second logic/circuitry of, for example, a network interface, that is to send the request.

Message flow 1000 may include, at 1008, the EM/EMF 140 checking a validity of the relation between the subject VNF instance and PNF instance. The EM/EMF 140 may process the request and determine whether the relationship between the VNF instance and the PNF instance is valid. The determination of whether the relation is valid may include checking parameters/attributes of the VNF instance and PNF instance for compatibility or interoperability with one another.

If the validity check succeeds, the EM/EMF 140 may configure the VNF instance or the PNF instance to establish the relation. To configure the VNF instance or the PNF instance to establish the relation, the EM/EMF 140 may configure an IOC that represents the VNF instance or an IOC that represents the PNF instance to indicate the relation has been established.

At 1012, the message flow 1000 may include the EM/EMF 140 generating and sending a response regarding a status of the relation establishment. If the validity check of 1008 is successful, the response may indicate that the VNF/PNF relation has been established.

Otherwise, the response may indicate that the VNF/PNF relation has not been established and may further include one or more causes that may be associated with the non-establishment of the relation.

In some embodiments, various cardinalities of relations between VNFs and PNFs may be supported. For example, in some embodiments the request 1004 may be a request to establish a relationship between one VNF instance and a plurality of PNF instances, where the plurality of PNF instances are respectively associated with a corresponding plurality of gNBs.

Figure 11:
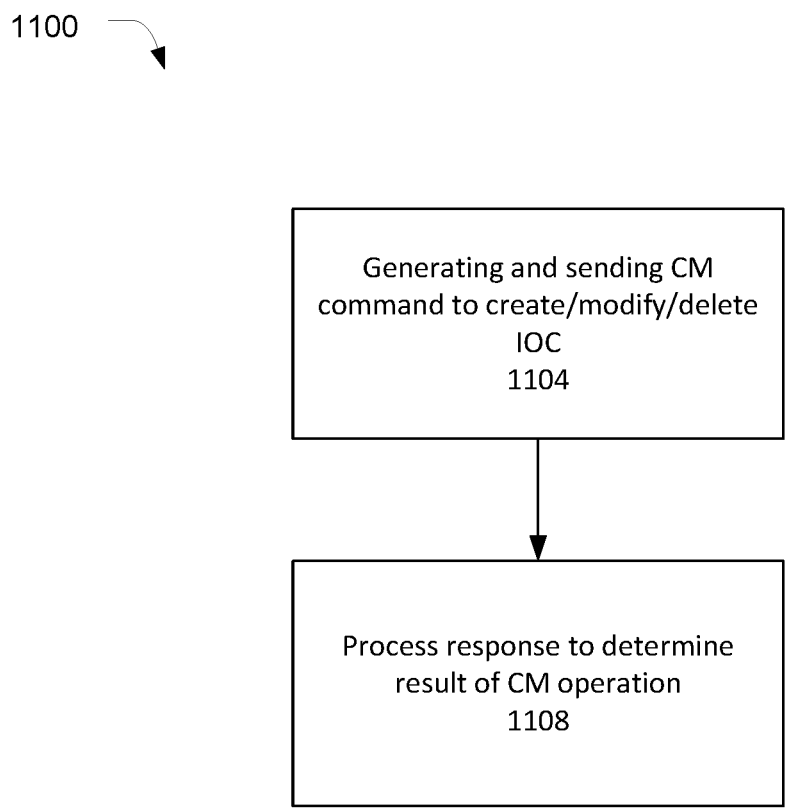
FIG. 11 illustrates an example operation flow/algorithmic structure of a network manager/network manager function in accordance with some embodiments.

FIG. 11 illustrates an example operation flow/algorithmic structure 1100 of the NM/NMF 138 according to some embodiments. In particular, the NM/NMF 138 may have logic/circuitry to implement an IRP manager (for example, IRP manager 904) to perform some or all of the operation flow/algorithmic structure 1100.

The operation flow/algorithmic structure 1100 may include, at 1104, generating and sending a CM command to create, modify, or delete an IOC. The IOC may be used to represent a gNB, in whole or in part. For example, the IOC may be an IOC gNB to represent the gNB, an IOC CU to represent a CU of the gNB, an IOC DU to represent a DU of the gNB, or an GUTRAN Cell IOC to represent a GUTRAN cell to be provided by the gNB.

The IOC related to the CM command of 1104 may have a containment/inheritance relationship according to any one of NRMs 400, 500, 600, or 700.

The operation flow/algorithmic structure 1100 may further include, at 1108, processing a response to determine a result of the CM operation that was performed based on the CM command 1104.

Figure 12:
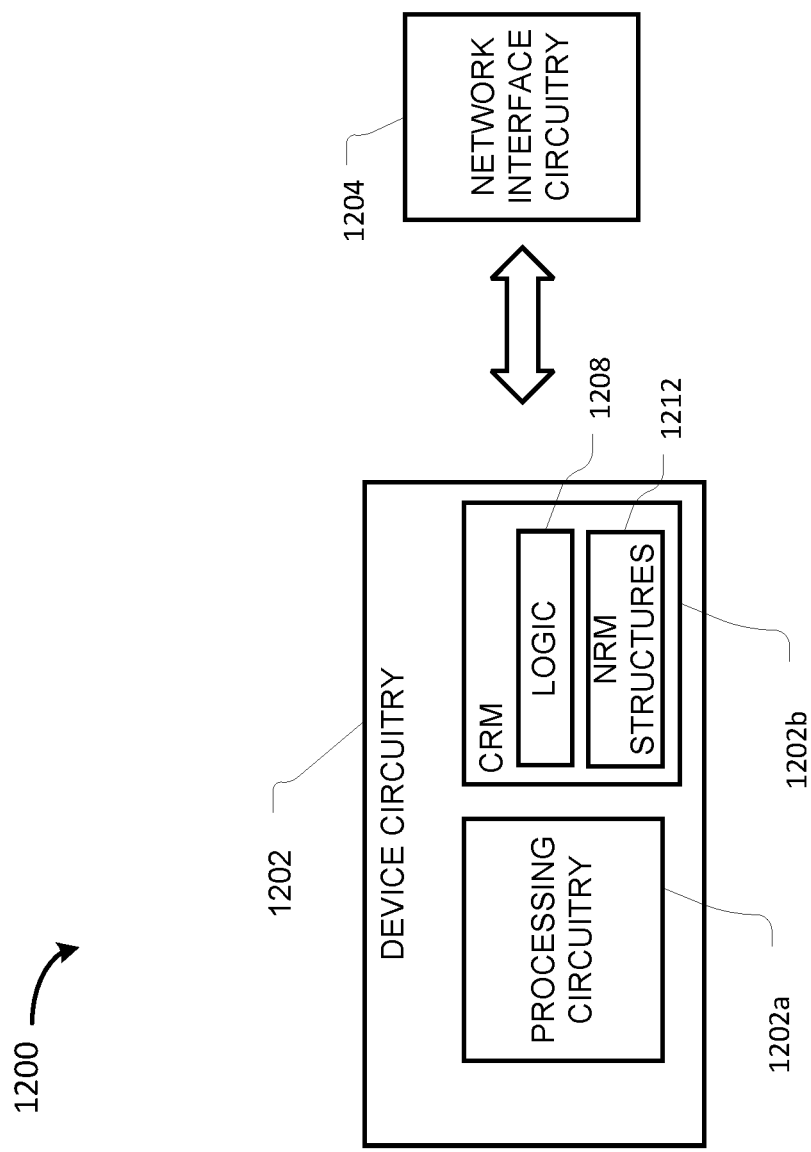
FIG. 12 illustrates an electronic device in accordance with some embodiments.

Embodiments described herein may be implemented into a system using any suitably configured hardware or software. FIG. 12 illustrates, for one embodiment, example components of an electronic device 1200. In embodiments, the electronic device 1200 may be, implement, be incorporated into, or otherwise be a part of NM/NMF 138, EM/EMF 140, VNFM 116, NFVI 152, NFVO 112 or some other device.

In some embodiments, the electronic device 1200 may include device circuitry 1202 coupled with network interface circuitry 1204 for communicating over a wired interface (for example, an X2 interface, an Si interface, an Itf-N and the like). In some embodiments, the device circuitry 1202 may receive CM commands over the interface and perform various CM operations based on the CM commands as described herein.

As used herein, the term "circuitry" may refer to, be part of, or include an application specific integrated circuit ("ASIC"), an electronic circuit, a processor (shared, dedicated, or group), or memory (shared, dedicated, or group) that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The device circuitry 1202 may include one or more processors. For example, the device circuitry 1202 may include circuitry such as, but not limited to, processing circuitry 1202a having one or more single-core or multi-core processors. The processing circuitry 1202a may include any combination of general-purpose processors and dedicated processors (e.g., graphics processors, application processors, digital signal processors, etc.). The processing circuitry 1202a may be coupled with or may include computer-readable media 1202b (also referred to as "CRM 1202b," "memory 1202b," "storage 1202b," or "memory/storage 1202b") and may be configured to execute instructions stored in the CRM 1202b to enable various applications, tasks, threads, or operating systems to run on the electronic device 1200.

The CRM 1202b for one embodiment may include any combination of suitable volatile memory or non-volatile memory. The CRM 1202b may include any combination of various levels of memory/storage including, but not limited to, read-only memory ("ROM") having embedded software instructions (e.g., firmware), random access memory (e.g., dynamic random access memory ("DRAM")), cache, buffers, etc. The CRM 1202b may be shared among the various processors or dedicated to particular processors.

In some embodiments, the CRM 1202b may include logic 1208 to implement NM/NMF 138, IRP manager 904, EM/EMF 140, IRP agent 908, VNFM 116, NFVI 152, NFVO 112, etc. to perform configuration and lifecycle management operations as described herein.

The CRM 1202b may also include NRM structures 1212, which may include the IOCs modelled as described above with respect to NRM 400, 500, 600, or 700 in accordance with some embodiments.

Components of the device circuitry 1202 may be suitably combined in a single chip, or a single chipset, or disposed on a same circuit board in some embodiments.

The network interface circuitry 1204 may be one or more computer hardware components that connect electronic device 1200 to one or more network elements, such as one or more servers within a core network via a wired connection. To this end, the network interface circuitry 1204 may include one or more dedicated processors or field programmable gate arrays ("FPGAs") to communicate using one or more network communications protocols such as X2 application protocol ("AP"), Si AP, Stream Control Transmission Protocol ("SCTP"), Ethernet, Point-to-Point ("PPP"), Fiber Distributed Data Interface ("FDDI"), or any other suitable network communications protocols.

In some embodiments, the electronic device 1200 may be configured to perform one or more processes, techniques, or methods as described herein, or portions thereof. For example, the electronic device 1200 may implement aspects of message flows 800 or 1000 or aspects of the flow/structure 1100. In general, the processing circuitry 1202a may construct messages for transmission, process received messages to determine attribute values or other information, and cause transmission of the messages by providing the generated message to the network interface circuitry 1204. The network interface circuitry 1204 may send/receive the messages over appropriate network connections.

Figure 13:
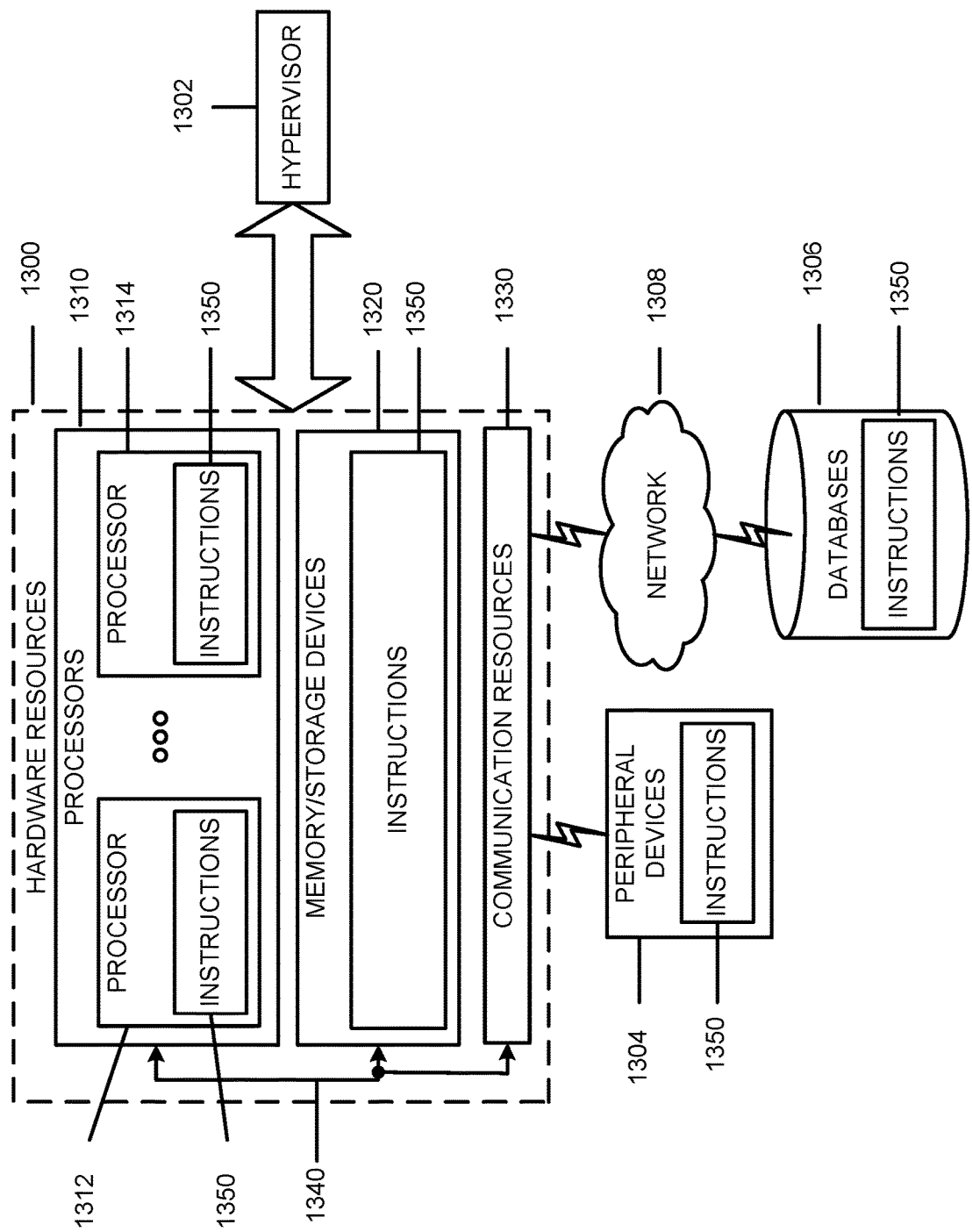
FIG. 13 illustrates hardware resources in accordance with some embodiments.

FIG. 13 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 13 shows a diagrammatic representation of hardware resources 1300 including one or more processors (or processor cores) 1310, one or more memory/storage devices 1320, and one or more communication resources 1330, each of which may be communicatively coupled via a bus 1340. For embodiments where node virtualization (for example, NFV) is utilized, a hypervisor 1302 may be executed to provide an execution environment for one or more network slices/sub-slices to utilize the hardware resources 1300.

The processors 1310 (for example, a CPU, a reduced instruction set computing ("RISC") processor, a complex instruction set computing ("CISC") processor, a graphics processing unit ("GPU"), a digital signal processor ("DSP") such as a baseband processor, an application specific integrated circuit ("ASIC"), a radio-frequency integrated circuit ("RFIC"), another processor, or any suitable combination thereof) may include, for example, a processor 1312 and a processor 1314. The processors may correspond to any processors of processing circuitry 1202a or network interface circuitry 1204 of FIG. 12. The memory/storage devices 1320 may include main memory, disk storage, or any suitable combination thereof. The memory/storage devices 1320 may include, but are not limited to, any type of volatile or non-volatile memory such as dynamic random access memory ("DRAM"), static random-access memory ("SRAM"), erasable programmable read-only memory ("EPROM"), electrically erasable programmable read-only memory ("EEPROM"), Flash memory, solid-state storage, etc. The memory/storage devices 1320 may correspond to CRM 1202b of FIG. 12.

The communication resources 1330 may include interconnection or network interface components or other suitable devices to communicate with one or more peripheral devices 1304 or one or more databases 1306 via a network 1308. For example, the communication resources 1330 may include wired communication components (for example, for coupling via a Universal Serial Bus ("USB")), cellular communication components, near-field communication ("NFC") components, Bluetooth® components (for example, Bluetooth® Low Energy), Wi-Fi® components, and other communication components.

Instructions 1350 may comprise software, a program, an application, an applet, an app, or other executable code for causing at least any of the processors 1310 to perform any one or more of the methodologies discussed herein.

The instructions 1350 may cause the processors 1310 to perform aspects of message flows 800 or 1000, flow/structure 1100, or other operations of NM/NMF 138, IRP manager 904, EM/EMF 140, IRP agent 908, VNFM 116, NFVI 152, NFVO 112, etc. described herein.

The instructions 1350 may reside, completely or partially, within at least one of the processors 1310 (for example, within the processor's cache memory), the memory/storage devices 1320, or any suitable combination thereof. Furthermore, any portion of the instructions 1350 may be transferred to the hardware resources 1300 from any combination of the peripheral devices 1304 or the databases 1306. Accordingly, the memory of processors 1310, the memory/storage devices 1320, the peripheral devices 1304, and the databases 1306 are examples of computer-readable and machine-readable media.

The resources described in FIG. 13 may also be referred to as circuitry. For example, communication resources 1330 may also be referred to as communication circuitry 1330.

Some non-limiting examples are provided below.

Example 1 includes one or more computer-readable media having instructions that, when executed by one or more processors, cause a network manager ("NM") or network manager function ("NMF") to: generate and send a configuration management ("CM") command to an element manager ("EM") or element manager function ("EMF") to create, modify, or delete an information object class ("IOC") that is to represent a next generation node B ("gNB"), wherein the IOC is a gNB Function IOC to represent the gNB, a Central Unit ("CU") IOC to represent a CU of the gNB, a Distributed Unit ("DU") IOC to represent a DU of the gNB, or a next generation universal terrestrial radio access network ("GUTRAN") Cell IOC to represent a GUTRAN cell to be provided by the gNB; and process a response from the EM to determine a result of a CM operation performed based on the CM command.

Example 2 includes the one or more computer-readable media of example 1 or some other example, wherein the IOC is an gNB Function IOC that contains the CU IOC to represent the CU of the gNB or the DU IOC to represent the DU of the gNB.

Example 3 includes the one or more computer-readable media of example 2 or some other example, wherein the gNB Function IOC contains the CU IOC and the DU IOC and further contains the GUTRAN Cell IOC to represent the GUTRAN cell.

Example 4 includes the one or more computer-readable media of example 3 or some other example, wherein the gNB Function IOC contains the CU IOC, which contains the DU IOC.

Example 5 includes the one or more computer-readable media of example 1 or some other example, wherein the IOC is contained by a Managed Element IOC and is the CU IOC or the DU IOC.

Example 6 includes the one or more computer-readable media of example 5 or some other example, wherein the IOC is the CU IOC and the Managed Element IOC also contains the DU IOC.

Example 7 includes the one or more computer-readable media of example 6 or some other example, wherein the CU IOC contains the GUTRAN Cell IOC.

Example 8 includes the one or more computer-readable media of example 5 or some other example, wherein the IOC is the CU IOC that contains the DU IOC.

Example 9 includes one or more computer-readable media having instructions that, when executed, cause a network manager ("NM") or a network manager function ("NMF") to: generate a request to establish a relationship between a virtual network function ("VNF") instance and a physical network function ("PNF") instance to form a next generation node B ("gNB"), wherein the VNF instance is to provide a centralized unit of the gNB and the PNF instance is to provide a distributed unit of the gNB; cause the request to be sent to an element manager ("EM") or an element manager function ("EMF"); and process a response to the request, the response to indicate whether the relationship was established.

Example 10 includes the one or more computer-readable media of example 9 or some other example, wherein the response is to indicate that the relationship was not established.

Example 11 includes the one or more computer-readable media of example 10 or some other example, wherein the response is to include a cause as to why the relationship was not established.

Example 12 includes the one or more computer-readable media of example 9 or some other example, wherein the response is to indicate that the relationship was established.

Example 13 includes the one or more computer-readable media of example 9 or some other example, wherein the request is to establish a relationship between the VNF instance and a plurality of PNF instances, wherein the plurality of PNF instances are respectively associated with a corresponding plurality of gNBs.

Example 14 includes one or more computer-readable media having instructions that, when executed, cause an element manager ("EM") or an element manager function ("EMF") to: process a request to establish a relation between a virtual network function ("VNF") instance and a physical network function ("PNF") instance to form a next generation node B ("gNB"), wherein the VNF instance is to provide a centralized unit of the gNB and the PNF instance is to provide a distributed unit of the gNB; determine whether the relation between the VNF instance and the PNF instance is valid; generate a response to the request to indicate whether the relation between the VNF instance and the PNF instances valid; and cause the response to be sent to a network manager ("NM") or a network manager function ("NMF").

Example 15 includes the one or more computer-readable media of example 14 or some other example, wherein the instructions, when executed, further cause the EM or EMF to: determine the relation between the VNF instance and the PNF instance is valid; configure the VNF instance and the PNF instance to establish the relation, wherein the response is to indicate that the relation has been established.

Example 16 includes the one or more computer-readable media of example 15 or some other example, wherein to configure the VNF instance and the PNF instance to establish the relation comprises: configure an IOC that represents the VNF instance to indicate that the VNF instance has a relation with the PNF instance, and configure an IOC that represents the PNF instance to indicate that the PNF instance has a relation with the VNF instance.

Example 17 includes the one or more computer-readable media of example 14 or some other example, wherein the instructions, when executed, further cause the EM or EMF to: determine the relation between the VNF instance and the PNF instance is invalid; generate a response to indicate that the relation cannot be established; and cause the response to be sent to the NM or NMF.

Example 18 includes an apparatus to provide an element manager ("EM") or an element manager function ("EMF"), the apparatus comprising: memory to store a plurality of information object classes ("IOCs") to represent a next generation node B ("gNB") according to a network resource model ("NRM"), the plurality of IOCs to include an gNB Function IOC to represent the gNB, a Central Unit ("CU") IOC to represent a CU of the gNB, a Distributed Unit ("DU") IOC to represent a DU of the gNB, or a next generation universal terrestrial radio access network ("GUTRAN") Cell IOC to represent a GUTRAN cell to be provided by the gNB; and processing circuitry to perform one or more configuration management operations with respect to the plurality of IOCs.

Example 19 includes the apparatus of example 18 or some other example, wherein the plurality of IOCs includes the gNB IOC that contains the CU IOC to represent the CU of the gNB or the DU IOC to represent the DU of the gNB.

Example 20 includes the apparatus of example 19 or some other example, wherein the gNB Function IOC contains the CU IOC and the DU IOC and further contains the GUTRAN Cell IOC to represent the GUTRAN cell.

Example 21 includes the apparatus of example 20 or some other example, wherein the gNB Function IOC contains the CU IOC, which contains the DU IOC.

Example 22 includes the apparatus of example 18 or some other example, wherein the IOC is contained by a Managed Element IOC and is the CU IOC or the DU IOC.

Example 23 includes the apparatus of example 22 or some other example, wherein the IOC is the CU IOC, which contains the GUTRAN Cell IOC, and the Managed Element IOC also contains the DU IOC.

Example 24 includes the apparatus of example 22 or some other example, wherein the IOC is the CU IOC that contains the DU IOC.

Example 25 includes the apparatus of any one of examples 18-24 or some other example, further comprising: network interface circuitry to receive configuration management commands, from a network manager or network manager function, to perform the one or more configuration management operations.

Example 26 includes a method comprising: generating and sending a configuration management ("CM") command to an element manager ("EM") or element manager function ("EMF") to create, modify, or delete an information object class ("IOC") that is to represent a next generation node B ("gNB"), wherein the IOC is a gNB Function IOC to represent the gNB, an Central Unit ("CU") IOC to represent a CU of the gNB, a Distributed Unit ("DU") IOC to represent a DU of the gNB, or a next generation universal terrestrial radio access network ("GUTRAN") Cell IOC to represent a GUTRAN cell to be provided by the gNB; and processing a response from the EM to determine a result of a CM operation performed based on the CM command.

Example 27 includes the method of example 26 or some other example, wherein the IOC is an gNB Function IOC that contains the CU IOC to represent the CU of the gNB or the DU IOC to represent the DU of the gNB.

Example 28 includes the method of example 27 or some other example, wherein the gNB Function IOC contains the CU IOC and the DU IOC and further contains the GUTRAN Cell IOC to represent the GUTRAN cell.

Example 29 includes the method of example 28 or some other example, wherein the gNB Function IOC contains the CU IOC, which contains the DU IOC.

Example 30 includes the method of example 26 or some other example, wherein the IOC is contained by a Managed Element IOC and is the CU IOC or the DU IOC.

Example 31 includes the method of example 30 or some other example, wherein the IOC is the CU IOC and the Managed Element IOC also contains the DU IOC.

Example 32 includes the method of example 31 or some other example, wherein the CU IOC contains the GUTRAN Cell IOC.

Example 33 includes the method of example 30 or some other example, wherein the IOC is the CU IOC that contains the DU IOC.

Example 34 includes a method comprising: generating a request to establish a relationship between a virtual network function ("VNF") instance and a physical network function ("PNF") instance to form a next generation node B ("gNB"), wherein the VNF instance is to provide a centralized unit of the gNB and the PNF instance is to provide a distributed unit of the gNB; causing the request to be sent to an element manager ("EM") or an element manager function ("EMF"); and processing a response to the request, the response to indicate whether the relationship was established.

Example 35 includes the method of example 34 or some other example, wherein the response is to indicate that the relationship was not established.

Example 36 includes the method of example 35 or some other example, wherein the response is to include a cause as to why the relationship was not established.

Example 37 includes the method of example 34 or some other example, wherein the response is to indicate that the relationship was established.

Example 38 includes the method of example 9 or some other example, wherein the request is to establish a relationship between the VNF instance and a plurality of PNF instances, wherein the plurality of PNF instances are respectively associated with a corresponding plurality of gNBs.

Example 39 includes a method comprising: processing a request to establish a relation between a virtual network function ("VNF") instance and a physical network function ("PNF") instance to form a next generation node B ("gNB"), wherein the VNF instance is to provide a centralized unit of the gNB and the PNF instance is to provide a distributed unit of the gNB; determining whether the relation between the VNF instance and the PNF instance is valid; generating a response to the request to indicate whether the relation between the VNF instance and the PNF instances valid; and causing the response to be sent to a network manager ("NM") or a network manager function ("NMF").

Example 40 includes the method of example 39 or some other example, further comprising: determining the relation between the VNF instance and the PNF instance is valid; configuring the VNF instance and the PNF instance to establish the relation, wherein the response is to indicate that the relation has been established.

Example 41 includes the method of example 40 or some other example, wherein configuring the VNF instance and the PNF instance to establish the relation comprises: configuring an IOC that represents the VNF instance to indicate that the VNF instance has a relation with the PNF instance, and configure an IOC that represents the PNF instance to indicate that the PNF instance has a relation with the VNF instance.

Example 42 includes the method of example 39 or some other example, further comprising: determining the relation between the VNF instance and the PNF instance is invalid; generating a response to indicate that the relation cannot be established; and causing the response to be sent to the NM or NMF.

Example 43 includes a method comprising: storing a plurality of information object classes ("IOCs") to represent a next generation node B ("gNB") according to a network resource model ("NRM"), the plurality of IOCs to include an gNB Function IOC to represent the gNB, a Central Unit ("CU") IOC to represent a CU of the gNB, a Distributed Unit ("DU") IOC to represent a DU of the gNB, or a next generation universal terrestrial radio access network ("GUTRAN") Cell IOC to represent a GUTRAN cell to be provided by the gNB; and performing one or more configuration management operations with respect to the plurality of IOCs.

Example 44 includes the method of example 44 or some other example, wherein the plurality of IOCs includes the gNB IOC that contains the CU IOC to represent the CU of the gNB or the DU IOC to represent the DU of the gNB.

Example 45 includes the method of example 44 or some other example, wherein the gNB Function IOC contains the CU IOC and the DU IOC and further contains the GUTRAN Cell IOC to represent the GUTRAN cell.

Example 46 includes the method of example 45 or some other example, wherein the gNB Function IOC contains the CU IOC, which contains the DU IOC.

Example 47 includes the method of example 44 or some other example, wherein the IOC is contained by a Managed Element IOC and is the CU IOC or the DU IOC.

Example 48 includes the method of example 47 or some other example, wherein the IOC is the CU IOC, which contains the GUTRAN Cell IOC, and the Managed Element IOC also contains the DU IOC.

Example 49 includes the method of example 47 or some other example, wherein the IOC is the CU IOC that contains the DU IOC.

Example 50 includes the method of any one of examples 44-49 or some other example, further comprising: receiving configuration management commands, from a network manager or network manager function, to perform the one or more configuration management operations.

Example 51 includes an apparatus comprising means to perform one or more elements of a method described in or related to any of examples 26-50, or any other method or process described herein.

Example 52 includes one or more non-transitory computer-readable media comprising instructions to cause an electronic device, upon execution of the instructions by one or more processors of the electronic device, to perform one or more elements of a method described in or related to any of examples 26-50, or any other method or process described herein.

Example 53 includes an apparatus comprising logic, modules, or circuitry to perform one or more elements of a method described in or related to any of examples 26-50, or any other method or process described herein.

Example 54 includes an apparatus comprising: one or more processors and one or more computer-readable media comprising instructions that, when executed by the one or more processors, cause the one or more processors to perform a method described in or related to any of examples 26-50, or portions thereof.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. One or more non-transitory, computer-readable media having instructions that, when executed by one or more processors, cause a network manager ("NM") or network manager function ("NMF") to:

generate and send a configuration management ("CM") command to an element manager ("EM") or element manager function ("EMF") to create, modify, or delete an information object class ("IOC") that is to represent a next generation node B ("gNB"), wherein the IOC contains a next generation universal terrestrial radio access network ("GUTRAN") Cell IOC to represent a GUTRAN cell to be provided by the gNB, wherein the GUTRAN Cell IOC is contained in a gNB Function IOC that represents the gNB or a Central Unit ("CU") IOC that represents a CU of the gNB, further wherein the gNB Function IOC or the CU IOC that contains the GUTRAN Cell IOC is contained by a Managed Element IOC that also contains the CU IOC or a Distributed Unit (DU) IOC that represents a DU of the gNB; and process a response from the EM to determine a result of a CM operation performed based on the CM command.

2. The one or more non-transitory, computer-readable media of claim 1, wherein the GUTRAN Cell IOC is contained in a gNB Function IOC that contains the CU IOC or a the DU IOC.

3. The one or more non-transitory, computer-readable media of claim 2, wherein the gNB Function IOC contains the CU IOC and the DU IOC.

4. The one or more non-transitory, computer-readable media of claim 3, wherein the gNB Function IOC contains the CU IOC, which contains the GUTRAN Cell IOC.

5. The one or more non-transitory, computer-readable media of claim 1, wherein the GUTRAN Cell IOC is contained in the CU IOC.

6. The one or more non-transitory, computer-readable media of claim 5, wherein the CU IOC contains the DU IOC.

7. The one or more non-transitory, computer-readable media of claim 1, wherein the CU IOC does not contain the DU IOC.

8. An apparatus to provide an element manager ("EM") or an element manager function ("EMF"), the apparatus comprising:

memory to store a plurality of information object classes ("IOCs") to represent a next generation node B ("gNB") according to a network resource model ("NRM"), the plurality of IOCs to include a next generation universal terrestrial radio access network ("GUTRAN") Cell IOC to represent a GUTRAN cell to be provided by the gNB, wherein the GUTRAN Cell IOC is contained in a gNB Function IOC that represents the gNB or a Central Unit ("CU") IOC that represents a CU of the gNB, further wherein the gNB Function IOC or the CU IOC that contains the GUTRAN Cell IOC is contained by a Managed Element IOC that also contains the CU IOC or a Distributed Unit (DU) IOC that represents a DU of the gNB; and processing circuitry to perform one or more configuration management operations with respect to the plurality of IOCs.

9. The apparatus of claim 8, wherein the GUTRAN Cell IOC is contained in a gNB Function IOC that contains the CU IOC or the DU IOC.

10. The apparatus of claim 9, wherein the gNB Function IOC contains the CU IOC and the DU IOC.

11. The apparatus of claim 8, wherein the GUTRAN Cell IOC is contained in the CU IOC.

12. The apparatus of claim 8, wherein the CU IOC contains the DU IOC.

13. The apparatus of claim 8, further comprising: network interface circuitry to receive configuration management commands, from a network manager or network manager function, to perform the one or more configuration management operations.

14. A method, comprising:
storing a plurality of information object classes ("IOCs") to represent a next generation node B ("gNB") according to a network resource model ("NRM"), the plurality of IOCs to include a next generation universal terrestrial radio access network ("GUTRAN") Cell IOC to represent a GUTRAN cell to be provided by the gNB, wherein the GUTRAN Cell IOC is contained in a gNB Function IOC that represents the gNB or a Central Unit ("CU") IOC that represents a CU of the gNB, further wherein the gNB Function IOC or the CU IOC that contains the GUTRAN Cell IOC is contained by a Managed Element IOC that also contains the CU IOC or a Distributed Unit (DU) IOC that represents a DU of the gNB; and in response to a configuration management command, performing one or more configuration management operations with respect to the plurality of IOCs.

15. The method of claim 14, wherein the GUTRAN IOC is contained in a gNB Function IOC that contains the CU IOC or the DU IOC.

16. The method of claim 15, wherein the gNB Function IOC contains the CU IOC and the DU IOC.

17. The method of claim 16, wherein the gNB Function IOC contains the CU IOC, which contains the GUTRAN Cell IOC.

18. The method of claim 14, wherein the GUTRAN Cell IOC is contained in the CU IOC.

19. The method of claim 14, wherein the CU IOC contains the DU IOC.

* * * * *